US010016745B2

(12) United States Patent
Hunyadi Murph et al.

(10) Patent No.: US 10,016,745 B2
(45) Date of Patent: Jul. 10, 2018

(54) MULTIFUNCTIONAL NANOMATERIALS AND METHODS OF PHOTOTHERMAL HEATING AND CATALYSIS USING THE SAME

(71) Applicant: Savannah River Nuclear Solutions, LLC, Aiken, SC (US)

(72) Inventors: Simona E. Hunyadi Murph, Augusta, SC (US); George K. Larsen, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 15/183,222

(22) Filed: Jun. 15, 2016

(65) Prior Publication Data

US 2017/0361308 A1    Dec. 21, 2017

(51) Int. Cl.
*B01J 23/89*      (2006.01)
*C07C 213/02*     (2006.01)
*B01J 35/02*      (2006.01)

(52) U.S. Cl.
CPC ........ *B01J 23/8906* (2013.01); *B01J 35/023* (2013.01); *C07C 213/02* (2013.01)

(58) Field of Classification Search
None
See application file for complete search history.

(56) References Cited

U.S. PATENT DOCUMENTS

| 7,288,134 B2 | 10/2007 | Sun et al. |
| 8,247,025 B2 | 8/2012 | Lee |
| 8,784,895 B2 | 7/2014 | Messersmith et al. |
| 9,139,433 B2 | 9/2015 | Addiego et al. |

FOREIGN PATENT DOCUMENTS

| CN | 1251323 | 4/2000 |
| CN | 102436886 | 5/2012 |
| CN | 102500297 | 6/2012 |
| CN | 103084125 | 5/2013 |
| CN | 103134932 | 6/2013 |
| CN | 103240120 | 8/2013 |
| CN | 103285410 | 9/2013 |
| CN | 103185796 | 5/2015 |

OTHER PUBLICATIONS

Advanced Materials TechConnect Briefs 2015, cover page showing publication date of Jun. 8, 2015.*
Mahmoudi et al, Advanced Drug Delivery Reviews, 62, 2011, 24-46.*

(Continued)

*Primary Examiner* — Clinton A Brooks
(74) *Attorney, Agent, or Firm* — Dority & Manning, P.A.

(57) ABSTRACT

The present invention is directed to multifunctional nanomaterials for photothermal heating and catalytic applications. The present invention discloses a method of photothermally heating a solution. The present method also discloses a method of catalyzing a reaction. Both methods require a step of exposing a solution to at least one wavelength of the electromagnetic spectrum. A gold-iron oxide nanomaterial comprising an iron oxide substrate and discrete gold particles deposited on the substrate is also disclosed.

24 Claims, 3 Drawing Sheets

(56) References Cited

OTHER PUBLICATIONS

Wang et al., "Shape and size controlled alpha-$Fe_2O_3$ nanoparticles as supports for gold-catalysts; Synthesis and influence of support shape and size on catalytic performance", Appled Catalysis A: General 364 (2009), 42-47.

Cao et al., "In situ growth of Au nanoparticles on $Fe_2O_3$ nanocrystals for catalytic applications", CrystEngComm, 2012, 14, 7229-7235.

Nguyet et al., "Preparation of Gold Nanoparticles, Au/$Fe_2O_3$ by Using a Co-Precipitation Method and their Catalytic Activity", Journal of the Korean Physical Society, vol. 52, No. 5, May 2008, pp. 1345-1349.

Haruta, "Gold as a novel catalyst in the $21^{st}$ century: Preparation, working mechanism and applications", Gold Bulletin 2004, 37/1-2, pp. 27-36.

Haruta, "Catalysis of gold nanoparticles deposited on metal oxides", CATTECH, vol. 6, No. 3, 2002, pp. 102-115.

Corma et al, "Chemoselective hydrogenation of nitro compounds with supported gold catalysts", Science vol. 313, Jul. 21, 2006.

Chen et al., "$Fe_2O_3$@Au Core@Shell Nanoparticle-Graphene Nanocomposites as Theranostic Agents for Bioimaging and Chemo-Photothermal Synergistic Therapy", RSC Advances, 2015, 00, 1-3.

Jabeen et al., "Au-Nanomaterials as a Superior Choice for Near-Infrared Photothermal Therapy", Molecules 2014, 19, 20580-20593.

Sotiriou et al., Photothermal Killing of Cancer Cells by the Controlled Plasmonic Coupling of Silica-Coated Au/$Fe_2O_3$ Nanoaggregates, Advanced Functional Materials 2014, 1-10.

Gao et al., "Bifunctional combined Au-$Fe_2O_3$ nanoparticles for induction of cancer cell-specific apoptosis and real-time imaging", Biomaterials 33 (2012) 3710-3718.

Li et al., "$Fe_2O_3$@Au core/shell nanoparticle-based electrochemical DNA biosensor for *Escherichia coli* detection", Talanta 84 (2011) 607-613.

Sun et al., "Recognition and transmembrane delivery of bioconjugated $Fe_2O_3$@Au nanoparticles with living cells", Nanoscale, 2010, 2, 269-276.

Bao et al., "Synthesis of Magnetic $Fe_2O_3$/Au Core/Shell Nanoparticles for Bioseparation and Immunoassay Based on Surface-Enhanced Raman Spectroscopy", Langmuir 2009, 25(18), 10782-10787.

Shevchenko et al., "Gold/Iron Oxide Core/Hollow-Shell Nanoparticles", Advanced Materials, 2008, 20, 4323-4329.

Fang et al., "Monodisperse alpha-$Fe_2O_3$@$SiO_2$@Au core/shell nanocomposite spheres: synthesis, characterization and properties", Nanotechnology 19 (2008), 125601 (7pp).

Wang et al., "Core@shell nanomaterials: gold-coated magnetic oxide nanoparticles", Journal of Materials Chemistry, 2008, 18, 2629-2635.

Park et al., "Fabrication of magnetic core @ shell Fe oxide @ Au nanoparticles for interfacial bioactivity and bio-separation", Langmuir 2007, 23, 9050-9056.

Daniells et al., "The mechanism of low-temperature CO oxidation with Au/$Fe_2O_3$ catalysts: a combined Mossbauer, FT-IR and TAP reactor study", Journal of Catalysis 230 (2005) 52-65.

Lyon et al., "Synthesis of Fe oxide core/Au shell nanoparticles by iterative hydroxylamine seeding", Nano Letters 2004, vol. 4. No. 4, 719-723.

Blaser, "A Golden Boost to an Old Reaction", Science, vol. 313, Jul. 21, 2006 pp. 312-113.

Larsen et al., "Multifunctional $Fe_2O_3$—Au Nanoparticles with Different Shapes: Enhanced Catalysis, Photothermal Effects, and Magnetic Recyclability", Journal of Physical Chemistry, Apr. 12, 2016, 11 pages.

Larsen et al., Hybrid $Fe_2O_3$-Au Nanoparticles: Synthesis and Photothermal Properties, Advanced Materials: TechConnect Briefs 2015, pp. 219-222.

Hervés et al., "Catalysis by metallic nanoparticles in aqueous solution: model reactions", Chemical Society Reviews, Sep. 7, 2012, vol. 41, No. 17, 5577-5587.

Aditya et al., "Nitroarene reduction: a trusted model reaction to test nanoparticle catalysts", Chem. Commun., 2015, 51, 9410-9431.

Hunyadi Murph et al., "Multifunctional Hybrid $Fe_2O_3$-Au Nanoparticles for Efficient Plasmonic Heating", Journal of Visualized Experiments, 8 pages.

\* cited by examiner

MULTIFUNCTIONAL NANOMATERIALS AND METHODS OF PHOTOTHERMAL HEATING AND CATALYSIS USING THE SAME

FEDERAL RESEARCH STATEMENT

This invention was made with Government support under Contract No. DE-AC09-08SR22470, awarded by the U.S. Department of Energy. The Government has certain rights in the invention.

BACKGROUND OF THE INVENTION

Noble metal nanoparticles, such as gold nanoparticles, have been utilized for various applications due to their exhibition of localized surface plasmon resonances. The free electrons in these metals collectively oscillate when resonantly driven by electromagnetic radiation. These localized surface plasmon resonances can generate intense, highly confined electromagnetic fields thereby enabling the use of such metals and nanoparticles made from these metals in a variety of applications.

Although lab-scale processes require minimal amounts of these nanoparticles, larger industrial processes would require a significant quantity of such nanoparticles. Thus, when using gold nanoparticles, such processes can be quite expensive and thus present an obstacle to general use.

As a result, there is a need to provide an alternative material. In particular, there is a need to provide a nanomaterial that is relatively inexpensive or cheaper than gold yet can still provide the same or similar benefits and/or exhibit the same or similar properties as gold nanoparticles.

SUMMARY OF THE INVENTION

Aspects and advantages of the invention will be set forth in part in the following description, or may be apparent from the description, or may be learned through practice of the invention.

In accordance with one embodiment of the present invention, a method of photothermally heating a solution is disclosed. The method comprises a step of exposing the solution to at least one wavelength of light of the electromagnetic spectrum. The solution contains gold-iron oxide nanomaterials comprising an iron oxide substrate and discrete gold particles deposited on the iron oxide substrate.

In accordance with another embodiment of the present invention, a method of catalyzing a reaction is disclosed. The method comprises a step of exposing the solution to at least one wavelength in the visible light spectrum of the electromagnetic spectrum. The solution contains gold-iron oxide nanomaterials comprising an iron oxide substrate and discrete gold particles deposited on the iron oxide substrate. The solution also contains at least one reactant, reagent, or any combination thereof.

In accordance with another embodiment of the present invention, a gold-iron oxide nanomaterial is disclosed. The nanomaterial comprises an iron oxide substrate and discrete gold particles deposited on the iron oxide substrate. The nanomaterial has an average outer diameter of from 5 nm to 500 nm and the iron to gold atomic ratio of the nanomaterial is from 3 to 200.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, one embodiment of the present invention is directed to novel gold-iron oxide nanomaterials. In other embodiments, the present invention is directed to methods of photothermal heating and/or catalysis using such nanomaterials. The nanomaterials, in general, are multifunctional, exhibiting plasmonic and catalytic properties of gold and magnetic properties of iron oxide. These properties can be exploited to create nanomaterials that are more economical, effective, and active than pure gold nanoparticles, can also be recovered and recycled magnetically, and can transduce light to heat to increase reaction rates. In this regard, the gold-iron oxide nanomaterials may be employed as catalysts and/or employed for photothermal heating to increase the temperature of a solution, such as an aqueous solution.

According to the present invention, the gold-iron oxide nanomaterials comprise an iron oxide substrate onto which the gold nanoparticles are deposited. In general, the iron oxide substrate may be any form of substrate generally known and employed in the art. For instance, the substrate may be a nanosubstrate having at least one nanodimension. In this regard, the substrate may have at least one dimension (e.g., length, height, width, diameter, etc.) that is 1000 nm or less, such as 500 nm or less, such as 250 nm or less, such as 100 nm or less.

In one embodiment, the iron oxide substrate may be a nanosphere, a nanotube, a nanoring, or a combination thereof. In one particular embodiment, the iron oxide substrate comprises a nanosphere. In another particular embodiment, the iron oxide substrate comprises a nanotube. In another particular embodiment, the iron oxide substrate comprises a nanoring. Without intending to be limited by theory, it is believed that employing different shaped substrates can provide a resulting nanomaterial with different properties.

In one embodiment, the iron oxide substrate may have an average outer diameter of about 5 nm or more, such as 10 nm or more, such as 20 nm or more, such as 25 nm or more, such as 30 nm or more, such as 40 nm or more, such as 50 nm or more, such as 60 nm or more, such as 75 nm or more, such as 100 nm or more, such as 150 nm or more to about 500 nm or less, such as 300 nm or less, such as 250 nm or less, such as 225 nm or less, such as 200 nm or less, such as 190 nm or less, such as 175 nm or less, such as 150 nm or less, such as 100 nm or less, such as 90 nm or less, such as 75 nm or less, such as 60 nm or less.

In one embodiment, the iron oxide substrate may have an average inner diameter of about 5 nm or more, such as 10 nm or more, such as 20 nm or more, such as 30 nm or more, such as 40 nm or more, such as 50 nm or more, such as 60 nm or more, such as 75 nm or more, such as 100 nm or more, such as 150 nm or more to about 500 nm or less, such as 250 nm or less, such as 225 nm or less, such as 200 nm or less, such as 175 nm or less, such as 150 nm or less, such as 100 nm or less, such as 90 nm or less, such as 80 nm or less, such as 70 nm or less, such as 60 nm or less.

In one embodiment, the iron oxide substrate may have an average length of about 10 nm or more, such as 20 nm or more, such as 30 nm or more, such as 40 nm or more, such as 50 nm or more, such as 60 nm or more, such as 75 nm or more, such as 100 nm or more, such as 150 nm or more, such as 200 nm or more, such as 225 nm or more to about 500 nm or less, such as 400 nm or less, such as 300 nm or less, such as 275 nm or less, such as 250 nm or less, such as 200 nm or less, such as 150 nm or less, such as 140 nm or less, such as 130 nm or less.

In one particular embodiment, the iron oxide substrate comprises a nanosphere. In one embodiment, the nanospheres may have an average outer diameter of about 5 nm or more, such as 10 nm or more, such as 20 nm or more, such as 30 nm or more, such as 40 nm or more to about 500 nm or less, such as 250 nm or less, such as 200 nm or less, such as 150 nm or less, such as 100 nm or less, such as 75 nm or less, such as 60 nm or less.

In another particular embodiment, the iron oxide substrate comprises a nanotube. In one embodiment, the nanotubes may have an average outer diameter of about 5 nm or more, such as 10 nm or more, such as 20 nm or more, such as 30 nm or more, such as 40 nm or more, such as 50 nm or more, such as 60 nm or more, such as 75 nm or more to about 500 nm or less, such as 250 nm or less, such as 200 nm or less, such as 150 nm or less, such as 100 nm or less, such as 90 nm or less. In one embodiment, the nanotubes may have an average inner diameter of about 5 nm or more, such as 10 nm or more, such as 20 nm or more, such as 30 nm or more, such as 40 nm or more, such as 50 nm or more to about 500 nm or less, such as 250 nm or less, such as 200 nm or less, such as 150 nm or less, such as 100 nm or less, such as 90 nm or less, such as 70 nm or less, such as 60 nm or less. In one embodiment, the nanotubes may have an average length of about 10 nm or more, such as 20 nm or more, such as 50 nm or more, such as 75 nm or more, such as 100 nm or more, such as 150 nm or more, such as 200 nm or more, such as 225 nm or more to about 500 nm or less, such as 400 nm or less, such as 300 nm or less, such as 275 nm or less.

In another particular embodiment, the iron oxide substrate comprises a nanoring. In one embodiment, the nanorings may have an average outer diameter of about 5 nm or more, such as 10 nm or more, such as 25 nm or more, such as 50 nm or more, such as 75 nm or more, such as 100 nm or more, such as 150 nm or more to about 500 nm or less, such as 300 nm or less, such as 250 nm or less, such as 225 nm or less, such as 200 nm or less, such as 190 nm or less, such as 175 nm or less. In one embodiment, the nanorings may have an average inner diameter of about 5 nm or more, such as 10 nm or more, such as 20 nm or more, such as 30 nm or more, such as 40 nm or more, such as 50 nm or more, such as 60 nm or more, such as 75 nm or more to about 500 nm or less, such as 250 nm or less, such as 200 nm or less, such as 150 nm or less, such as 100 nm or less, such as 90 nm or less, such as 80 nm or less. In one embodiment, the nanorings may have an average length of about 10 nm or more, such as 20 nm or more, such as 50 nm or more, such as 75 nm or more, such as 100 nm or more to about 500 nm or less, such as 300 nm or less, such as 250 nm or less, such as 200 nm or less, such as 150 nm or less, such as 140 nm or less, such as 130 nm or less.

In one embodiment, the iron oxide may be an iron (II) oxide, an iron (III) oxide, an iron (II,III) oxide, or a combination thereof. In one embodiment, the iron oxide may be an iron (II) oxide. In another embodiment, the iron oxide may be an iron (II,III) oxide. In one particular embodiment, the iron oxide may be an iron (III) oxide.

For instance, in one embodiment, the iron oxide may be FeO. In another embodiment, the iron oxide may be $Fe_3O_4$, $Fe_4O_5$, $Fe_5O_6$, etc. In one particular embodiment, the iron oxide may be $Fe_2O_3$. In one embodiment, the $Fe_2O_3$ may be in an alpha base, a beta phase, a gamma phase, an epsilon phase, or a combination thereof.

In one embodiment, the iron oxide may be in a maghemite phase and/or a hematite phase. In one particular embodiment, the iron oxide may be ferrimagnetic. In one particular embodiment, the iron oxide may be ferromagnetic, such as weakly ferromagnetic.

According to the present invention, the gold-iron oxide nanomaterials comprise discrete gold particles present on the iron oxide substrate. In particular, these discrete gold particles may be discrete gold nanoparticles.

In one embodiment, the gold nanoparticles are discrete gold nanoparticles deposited or decorated onto the surface of the iron oxide substrate in a manner such that there is no agglomeration of the gold nanoparticles on the iron oxide substrate. In addition, the present inventors have discovered that the shapes of the iron oxide substrates generally do not tend to influence the size nor the shape of the gold nanoparticles.

In one embodiment, the discrete gold nanoparticles have an average diameter of about 5 nm or more, such as 10 nm or more, such as 15 nm or more, such as 17.5 nm or more to about 100 nm or less, such as 75 nm or less, such as 50 nm or less, such as 40 nm or less, such as 30 nm or less, such as 25 nm or less, such as 22.5 nm or less. In one embodiment, the discrete gold nanoparticles have an average diameter of from about 5 nm to about 100 nm, such as from about 10 nm to about 75 nm, such as from about 10 nm to about 50 nm, such as from about 15 nm to about 50 nm, such as from about 15 nm to about 40 nm, such as from about 15 nm to about 30 nm, such as from about 15 nm to about 25 nm, such as from about 17.5 nm to about 22.5 nm.

The average diameters can be determined using any method known in the art. For instance, the average diameters can be determined by analyzing particle sizes of an SEM image of the gold-iron oxide nanomaterial.

Without intending to be limited by theory, the growth and/or deposition of the gold nanoparticles on the iron oxide substrates may arise from different factors including: (1) gold precursors are partially reduced and form small clusters; (2) the clusters coalesce to form seed particles and the remaining gold ions become attached to the seed particles as co-ions; and (3) slow and (4) fast reduction of the remaining ionic gold, where the reduced gold monomers grow exclusively on top of the seed particles' surfaces until the precursor is fully consumed.

By modifying the iron substrate and coverage of the gold nanoparticles, the present inventors have discovered, as further discussed herein, that the properties of the resulting gold-iron oxide nanomaterials can be tailored thereby allowing for the use of these nanomaterials for various applications. For instance, employing both gold and iron oxide in the nanomaterials allows for the ability to take advantage of the physicochemical properties of both materials. In particular, gold combined with a magnetic material, such as iron oxide, to form the nanomaterials disclosed herein wherein the nanomaterials retain the interesting chemistry and plasmonic properties of gold but can also interact with external magnetic fields.

In one embodiment, the gold-iron oxide nanomaterials may have an average surface area of about 5 $m^2/g$ or more, such as 7.5 $m^2/g$ or more, such as 10 $m^2/g$ or more, such as 15 $m^2/g$ or more, such as 17.5 $m^2/g$ or more, such as 20 $m^2/g$ or more, such as 25 $m^2/g$ or more, such as 30 $m^2/g$ or more, such as 35 $m^2/g$ or more to about 200 $m^2/g$ or less, such as 150 $m^2/g$ or less, such as 100 $m^2/g$ or less, such as 50 $m^2/g$ or less, such as 45 $m^2/g$ or less, such as 40 $m^2/g$ or less, such as 35 $m^2/g$ or less, such as 30 $m^2/g$ or less, such as 25 $m^2/g$ or less, such as 20 $m^2/g$ or less, such as 15 $m^2/g$ or less.

In one embodiment, the iron oxide substrate of gold-iron oxide nanomaterials may have an average surface area of about 5 $m^2/g$ or more, such as 7.5 $m^2/g$ or more, such as 10 $m^2/g$ or more, such as 15 $m^2/g$ or more, such as 17.5 $m^2/g$ or more, such as 20 $m^2/g$ or more, such as 25 $m^2/g$ or more, such as 30 $m^2/g$ or more, such as 35 $m^2/g$ or more to about 200 $m^2/g$ or less, such as 150 $m^2/g$ or less, such as 100 $m^2/g$ or less, such as 50 $m^2/g$ or less, such as 45 $m^2/g$ or less, such as 40 $m^2/g$ or less, such as 35 $m^2/g$ or less, such as 30 $m^2/g$ or less, such as 25 $m^2/g$ or less, such as 20 $m^2/g$ or less, such as 15 $m^2/g$ or less.

In one embodiment, the gold nanoparticles of the gold-iron oxide nanomaterials may have an average surface area of about 0.0001 $m^2/g$ or more, such as 0.001 $m^2/g$ or more, such as 0.01 $m^2/g$ or more, such as 0.1 $m^2/g$ or more, such as 0.15 $m^2/g$ or more, such as 0.2 $m^2/g$ or more, such as 0.25 $m^2/g$ or more, such as 0.3 $m^2/g$ or more, such as 0.5 $m^2/g$ or more, such as 0.75 $m^2/g$ or more, such as 1 $m^2/g$ or more, such as 1.25 $m^2/g$ or more, such as 1.5 $m^2/g$ or more, such as 1.6 $m^2/g$ or more to about 10 $m^2/g$ or less, such as 5 $m^2/g$ or less, such as 3 $m^2/g$ or less, such as 2.5 $m^2/g$ or less, such as 2 $m^2/g$ or less, such as 1.9 $m^2/g$ or less, such as 1.8 $m^2/g$ or less, such as 1.5 $m^2/g$ or less, such as 1 $m^2/g$ or less, such as 0.75 $m^2/g$ or less, such as 0.5 $m^2/g$ or less, such as 0.4 $m^2/g$ or less, such as 0.35 $m^2/g$ or less, such as 0.3 $m^2/g$ or less.

In one particular embodiment, the nanomaterials comprising an iron oxide nanosphere may have an average surface area of about 5 $m^2/g$ or more, such as 7.5 $m^2/g$ or more, such as 10 $m^2/g$ or more, such as 15 $m^2/g$ or more, such as 17.5 $m^2/g$ or more, such as 20 $m^2/g$ or more to about 200 $m^2/g$ or less, such as 150 $m^2/g$ or less, such as 100 $m^2/g$ or less, such as 50 $m^2/g$ or less, such as 45 $m^2/g$ or less, such as 40 $m^2/g$ or less, such as 35 $m^2/g$ or less, such as 30 $m^2/g$ or less. In one embodiment, the iron oxide nanosphere substrate may have the aforementioned average surface area. In one embodiment, the gold nanoparticles of the gold-iron oxide nanomaterials comprising an iron oxide nanosphere may have an average surface area of about 0.0001 $m^2/g$ or more, such as 0.001 $m^2/g$ or more, such as 0.01 $m^2/g$ or more, such as 0.1 $m^2/g$ or more, such as 0.25 $m^2/g$ or more, such as 0.5 $m^2/g$ or more, such as 0.75 $m^2/g$ or more, such as 1 $m^2/g$ or more, such as 1.25 $m^2/g$ or more, such as 1.5 $m^2/g$ or more, such as 1.6 $m^2/g$ or more to about 10 $m^2/g$ or less, such as 5 $m^2/g$ or less, such as 3 $m^2/g$ or less, such as 2.5 $m^2/g$ or less, such as 2 $m^2/g$ or less, such as 1.9 $m^2/g$ or less, such as 1.8 $m^2/g$ or less.

In one particular embodiment, the nanomaterials comprising an iron oxide nanotube may have an average surface area of about 5 $m^2/g$ or more, such as 7.5 $m^2/g$ or more, such as 10 $m^2/g$ or more, such as 15 $m^2/g$ or more, such as 17.5 $m^2/g$ or more, such as 20 $m^2/g$ or more, such as 25 $m^2/g$ or more, such as 30 $m^2/g$ or more, such as 35 $m^2/g$ or more to about 200 $m^2/g$ or less, such as 150 $m^2/g$ or less, such as 100 $m^2/g$ or less, such as 50 $m^2/g$ or less, such as 45 $m^2/g$ or less. In one embodiment, the iron oxide nanotube substrate may have the aforementioned average surface area. In one embodiment, the gold nanoparticles of the gold-iron oxide nanomaterials comprising an iron oxide nanotube may have an average surface area of about 0.0001 $m^2/g$ or more, such as 0.001 $m^2/g$ or more, such as 0.01 $m^2/g$ or more, such as 0.1 $m^2/g$ or more, such as 0.15 $m^2/g$ or more, such as 0.2 $m^2/g$ or more, such as 0.25 $m^2/g$ or more to about 10 $m^2/g$ or less, such as 5 $m^2/g$ or less, such as 3 $m^2/g$ or less, such as 2.5 $m^2/g$ or less, such as 2 $m^2/g$ or less, such as 1.9 $m^2/g$ or less, such as 1.8 $m^2/g$ or less, such as 1.5 $m^2/g$ or less, such as 1 $m^2/g$ or less, such as 0.75 $m^2/g$ or less, such as 0.5 $m^2/g$ or less, such as 0.4 $m^2/g$ or less, such as 0.35 $m^2/g$ or less, such as 0.3 $m^2/g$ or less.

In one particular embodiment, the nanomaterials comprising an iron oxide nanoring may have an average surface area of about 5 $m^2/g$ or more, such as 7.5 $m^2/g$ or more, such as 10 $m^2/g$ or more to about 200 $m^2/g$ or less, such as 150 $m^2/g$ or less, such as 100 $m^2/g$ or less, such as 50 $m^2/g$ or less, such as 45 $m^2/g$ or less, such as 40 $m^2/g$ or less, such as 35 $m^2/g$ or less, such as 30 $m^2/g$ or less, such as 25 $m^2/g$ or less, such as 20 $m^2/g$ or less, such as 15 $m^2/g$ or less. In one embodiment, the iron oxide nanoring substrate may have the aforementioned average surface area. In one embodiment, the gold nanoparticles of the gold-iron oxide nanomaterials comprising an iron oxide nanoring may have an average surface area of about 0.0001 $m^2/g$ or more, such as 0.001 $m^2/g$ or more, such as 0.01 $m^2/g$ or more, such as 0.1 $m^2/g$ or more, such as 0.15 $m^2/g$ or more, such as 0.2 $m^2/g$ or more, such as 0.25 $m^2/g$ or more, such as 0.3 $m^2/g$ or more to about 10 $m^2/g$ or less, such as 5 $m^2/g$ or less, such as 3 $m^2/g$ or less, such as 2.5 $m^2/g$ or less, such as 2 $m^2/g$ or less, such as 1.9 $m^2/g$ or less, such as 1.8 $m^2/g$ or less, such as 1.5 $m^2/g$ or less, such as 1 $m^2/g$ or less, such as 0.75 $m^2/g$ or less, such as 0.5 $m^2/g$ or less, such as 0.4 $m^2/g$ or less, such as 0.35 $m^2/g$ or less.

In addition, the methods disclosed herein can be employed to tailor the specific concentrations of the various elements in the nanomaterials. For instance, the iron and gold concentrations may be maintained within a desired ratio. For instance, in one embodiment, the iron to gold atomic ratio, as determined using energy dispersive X-ray analysis, may be 3 or more, such as 5 or more, such as 7 or more, such as 10 or more, such as 15 or more, such as 20 or more, such as 25 or more, such as 40 or more, such as 45 or more, such as 50 or more to 200 or less, such as 150 or less, such as 100 or less, such as 90 or less, such as 80 or less, such as 70 or less, such as 60 or less, such as 50 or less, such as 30 or less, such as 25 or less, such as 20 or less, such as 15 or less.

In one embodiment, when the nanomaterial comprises an iron oxide nanosphere, the iron to gold atomic ratio, as determined using energy dispersive X-ray analysis, may be 3 or more, such as 5 or more, such as 7 or more to 200 or less, such as 100 or less, such as 50 or less, such as 30 or less, such as 25 or less, such as 20 or less, such as 15 or less.

In one embodiment, when the nanomaterial comprises an iron oxide nanotube, the iron to gold atomic ratio, as determined using energy dispersive X-ray analysis, may be 5 or more, such as 10 or more, such as 25 or more, such as 40 or more, such as 50 or more to 200 or less, such as 150 or less, such as 100 or less, such as 90 or less, such as 80 or less, such as 70 or less, such as 60 or less.

In one embodiment, when the nanomaterial comprises an iron oxide nanoring, the iron to gold atomic ratio, as determined using energy dispersive X-ray analysis, may be 5 or more, such as 10 or more, such as 25 or more, such as 40 or more, such as 45 or more to 200 or less, such as 150 or less, such as 100 or less, such as 90 or less, such as 80 or less, such as 70 or less, such as 60 or less, such as 50 or less.

While the gold-iron oxide nanomaterials may be prepared in similar manners, the present inventors have discovered that the gold loading depends on the morphology of the iron oxide substrate. In general, when using a similar approach, the nanospheres may have the highest gold loading than the nanorings and the nanotubes. Without intending to be limited by theory, it is surprising that the nanospheres generally have the highest loading even though they have the smallest structure and the greatest curvature. This could be due to various reasons (e.g., synthesis of the substrates, crystal structure of the iron oxide, surface charges of the substrates, etc.).

According to the UV-visible spectroscopy measurements, a distinctive peak emerges when decorating or depositing gold nanoparticles onto the iron oxide substrates. In one embodiment, for the resulting gold-iron oxide nanomaterial, a peak emerges at a wavelength of from 500 nm to 600 nm, such as 500 nm to 550 nm, such as 510 nm to 540 nm, such as 510 nm to 530 nm, such as 515 nm to 525 nm. In particular, in one embodiment, a peak emerges at a wavelength of approximately 520 nm, which matches the localized surface plasmon resonance of the pure gold nanoparticles. Without intending to be limited by theory, the plasmonic properties of the gold-iron oxide nanoparticles are evident in their optical properties demonstrating that the materials are nanocomposite structures and not simply mixtures of individual nanoparticles.

In addition, by replacing some of the gold with the iron oxide, the nanomaterials can be magnetically recoverable by simply applying an external magnetic field. For instance, the iron oxide materials have magnetic properties which allow for external manipulation using magnetic fields. This can be utilized to collect and recycle the nanomaterials after use (e.g., after a reaction is complete).

The nanomaterials disclosed herein may be synthesized using any method generally known in the art. For instance, in one embodiment, the nanomaterials may be synthesized using a wet chemical approach.

In addition to the other benefits disclosed herein, the gold-iron oxide nanomaterials are able to photothermally heat solutions. For instance, the nanomaterials may be employed to transduce heat from light absorption thereby allowing the nanomaterials to heat solutions. In general, light absorption in nanoparticles or nanomaterials is readily dissipated as heat. Without intending to be limited by theory, because of their large absorbance cross-section, plasmonic nanoparticles can generate a significant amount of heat and increase temperatures in their vicinities.

In particular, the gold-iron oxide nanomaterials can photothermally heat aqueous solutions as efficiently as pure gold nanoparticles. In addition, the concentration of the gold-iron oxide nanomaterials can be substantially less than the concentration of gold nanoparticles required to heat such solutions to a certain temperature.

In one embodiment, the present disclosure can be directed to a method of photothermally heating a solution. The solution contains a gold-iron oxide nanomaterial as disclosed herein. The concentration of the nanomaterials may be any concentration necessary to achieve a desired effect. For instance, in one embodiment, the concentration may be $1\times10^{-7}$ M or more, such as $1\times10^{-6}$ M or more, such as $1\times10^{-5}$ M or more, such as $1\times10^{-4}$ M or more, such as $1\times10^{-3}$ M or more to $1\times10$ M or less, such as $1\times10^{-1}$ M or less, such as $1\times10^{-2}$ M or less, such as $1\times10^{-3}$ M or less. However, it should be understood that the present invention is not necessarily limited by the concentration of the nanomaterials.

The method comprises a step of at least exposing the solution to at least one wavelength of light of the electromagnetic spectrum. For instance, the wavelength of light may be from the infrared spectrum, visible light spectrum, and/or the ultraviolet spectrum. For instance, the solution may be exposed to a wavelength of light of from 10 nm to 1 mm.

For instance, in one embodiment, the solution may be exposed to at least one wavelength of light from the visible light spectrum. For instance, in one embodiment, the solution may simply be exposed to visible light. In another embodiment, the solution may be exposed to a laser having an emission at a wavelength in the visible spectrum. As discussed herein, the visible light spectrum includes wavelengths of from 400 nm to 750 nm. In this regard, the solution may be exposed to a wavelength of light from the visible light spectrum having a wavelength of from 400 nm to 750 nm, such as from 450 nm to 650 nm, such as from 500 nm to 600 nm, such as from 500 nm to 550 nm.

In another embodiment, the solution may be exposed to a wavelength of light from the infrared spectrum. As discussed herein, light from the infrared spectrum has a wavelength of from 750 nm to 1 mm. In this regard, the solution may be exposed to a wavelength of light from the infrared spectrum having a wavelength of from 750 nm to 1 mm, such as from 800 nm to 950 nm, such as from 800 nm to 900 nm.

In another embodiment, the solution may be exposed to a wavelength of light from the ultraviolet spectrum. As discussed herein, light from the ultraviolet spectrum has a wavelength of from 10 nm to 400 nm. In this regard, the solution may be exposed to a wavelength of light from the ultraviolet spectrum having a wavelength of from 10 nm to 400 nm, such as from 50 nm to 350 nm, such as from 100 nm to 300 nm.

In one embodiment, when the solution is exposed for at least 1 minute, such as at least 2 minutes, such as at least 3 minutes, such as at least 4 minutes, such as at least 5 minutes, such as at least 10 minutes, such as at least 15 minutes, the bulk temperature of the solution increases by at least 5° C., such as at least 10° C., such as at least 20° C., such as at least 30° C., such as at least 40° C. and generally about 100° C. or less, such as about 90° C. or less, such as about 80° C. or less, such as about 70° C. or less, such as about 60° C. or less, such as about 50° C. or less. Such exposure may be at any wavelength mentioned above, including wavelengths in the visible light spectrum, infrared spectrum, and/or ultraviolet spectrum. In one embodiment, such exposure is at a wavelength of 532 nm.

In one embodiment, the nanomaterials are characterized by the fact that when they are simply placed in water and exposed for at least 1 minute, such as at least 2 minutes, such as at least 3 minutes, such as at least 4 minutes, such as at least 5 minutes, such as at least 10 minutes, such as at least 15 minutes, the bulk temperature of the solution increases by at least 5° C., such as at least 10° C., such as at least 20° C., such as at least 30° C., such as at least 40° C. and generally about 100° C. or less, such as about 90° C. or less, such as about 80° C. or less, such as about 70° C. or less, such as about 60° C. or less, such as about 50° C. or less. Such exposure may be at any wavelength mentioned above, including wavelengths in the visible light spectrum, infrared spectrum, and/or ultraviolet spectrum. For instance, in one embodiment, such exposure may be at any particular wavelengths mentioned herein. In one embodiment, such exposure is at a wavelength of from 500 nm to 600 nm, such as from 500 nm to 550 nm, such as 520 nm to 540 nm, such as from 525 nm to 535 nm. In one embodiment, such exposure is at a wavelength of 532 nm and/or the concentration of the nanomaterials is $8.95 \times 10^{-6}$ M.

In general, the solution may be exposed to any wavelength that overlaps with the absorbance of the nanomaterials. In this regard, the photothermal effects can be induced using any such wavelength. Without intending to be limited by theory, it is believed that the heating efficiency is greater when illuminated on resonance.

In one embodiment, the solution may be an aqueous solution comprising water. In one embodiment, the solution may comprise reactants and/or reagents for a reaction. For instance, it has been found that the photothermal properties of the gold-iron oxide nanomaterials can be harnessed to increase temperatures and that as a result, this may also be used to increase a catalytic reaction rate. In this regard, the method may be directed to a method of photothermally heating a solution in combination with catalyzing a reaction.

The gold-iron oxide nanomaterials disclosed herein may also be employed for various catalysis applications. In particular, the nanomaterials may be employed to enhance the efficiency of certain reactions. As indicated in the examples, it has unexpectedly been discovered that the gold-iron oxide nanomaterials are even more efficient catalysts than the gold nanoparticles, even with a much lower loading of gold, which is the catalytically active material.

The gold-iron oxide nanomaterials disclosed herein may be employed in a variety of applications. These applications include, but are not limited to, plasmonic, magnetic, catalytic, imaging, sensing, and biological. In particular, the nanomaterials may be employed for chemical and biological sensing, hyperthermia treatment, environmental implications, plasmonic circuits, enhanced photocatalysts, medical diagnostics such as imaging applications including magnetic resonance imaging contrast agents, drug therapy (e.g., cancer therapy) and tracking and delivering drugs, etc.

EXAMPLES

Example 1—Synthesis of Gold Nanoparticles and Gold-Iron Oxide Nanomaterials

Commercially available chloroauric acid trihydrate ($HAuCl4*3H_2O$), trisodium citrate, and iron oxide were employed for the synthesis of the nanomaterials.

Gold nanospheres were prepared by a citrate reduction approach. With this synthesis, an aqueous solution $2.5 \times 10^{-4}$ M $HAuCl_4$ was heated to boiling and one percent by weight of sodium citrate solution was subsequently added. The boiling was continued until the solution turned ruby red, indicating the formation of gold nanoparticles.

Gold-iron oxide nanomaterials were prepared by a similar procedure by reducing the same amount of $Au^{3+}$ ions in the presence of $2.2 \times 10^{-4}$ M $Fe_2O_3$ nanoparticles. The solutions of Au nanospheres and gold-iron oxide nanomaterials were centrifuged twice at 7000 rpm for 5 minutes and redispersed in DI water to remove excess reactants.

Example 2—Characterization of Gold Nanoparticles and Gold-Iron Oxide Nanomaterials The morphology of the nanoparticles and nanomaterials was observed by scanning electron microscopy (Hitachi SU8200). The size distribution was obtained using dynamic light scattering measurements (Brookhaven Instruments, NanoBrook Omni). The chemical compositions were analyzed using inductively coupled plasma mass spectrometry (Agilent 7500s) and by energy dispersive X-ray analysis (Oxford Instruments). The crystalline properties of the solutions were characterized by X-ray diffraction (PANalytical X'pert Pro). The optical properties of the solutions were measured using UV-visible-near infrared spectroscopy (Tec5 MultiSpec). The magnetic properties of the samples were characterized by a vibrating sample magnetometer at room temperature. (Lake Shore Cryotronics).

Figure 1:
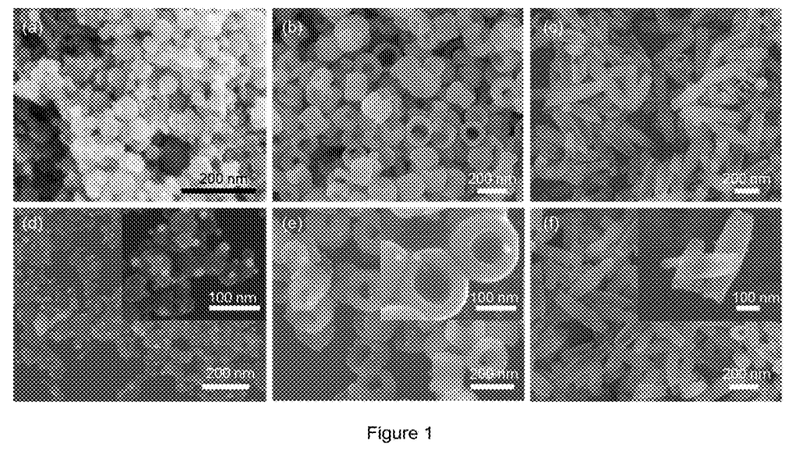
FIGS. 1a-1f provide SEM images of the iron oxide substrates and the gold-iron oxide nanomaterials of the examples.

As illustrated in FIGS. 1a-1c, the iron oxide substrates appear as well-defined nanospheres, nanorings, and nanotubes, respectively. As illustrated in FIGS. 1d-1f, discrete rounded gold particles appear on the surfaces of the iron oxide substrates.

The average morphological parameters of the gold nanoparticles, iron oxide substrates, and gold-iron oxide nanomaterials are listed in the following table.

|  | Gold Diameter (nm) | Iron Oxide | | |
| --- | --- | --- | --- | --- |
|  |  | Outer Diameter (nm) | Inner Diameter (nm) | Length (nm) |
| Gold nanoparticles | 20 | — | — | — |
| Gold-Iron oxide nanospheres | 20 | 48 | — | — |
| Gold-Iron oxide nanorings | 19 | 171 | 75 | 117 |
| Gold-Iron oxide nanotubes | 19 | 78 | 59 | 247 |
| Iron oxide nanospheres | — | 46 | — | — |
| Iron oxide nanorings | — | 169 | 76 | 117 |
| Iron oxide nanotubes | — | 81 | 61 | 251 |

According to the ICP-MS and EDX studies, it was determined that the iron and gold concentrations in the gold-iron oxide nanosphere nanomaterials were 500 ppb and 320 ppb, respectively. In comparison, the gold nanoparticles had a higher concentration of gold at 1000 ppm. The relative atomic ratios of the iron to gold for the nanospheres, nanorings, and nanotubes were found to be approximately 9, 49, and 55, respectively. In this regard, despite the similar preparation methods, the gold loading depends on the morphology of the iron oxide substrate.

According to the dynamic light scattering studies, it was determined that the hydrodynamic sizes are greater than those measured by SEM. This may indicate aggregation in solution. Also, by employing gold nanoparticles on the substrates, it can be seen that generally there is a decrease in the nanomaterial aggregation effect.

Figure 2:
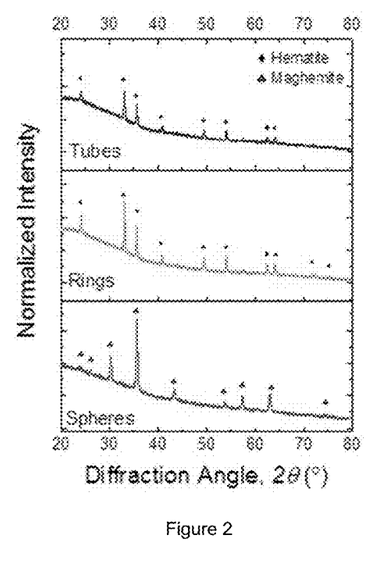
FIG. 2 provides the X-ray diffraction patterns of the iron oxide substrates of the examples.

According to the X-ray diffraction studies and as illustrated in FIG. 2, it was determined that the nanospheres are in the maghemite phase with no preferred orientation while the nanorings and nanotubes are in the hematite phase with no preferred orientation. Thus, it could also be a possibility that different crystal structures may play a role in the gold loading. For instance, different substrates could stabilize specific atomic configurations, charge states, or electronic properties of the gold nucleation centers, which could result in a distinct chemical behavior.

Figure 3:
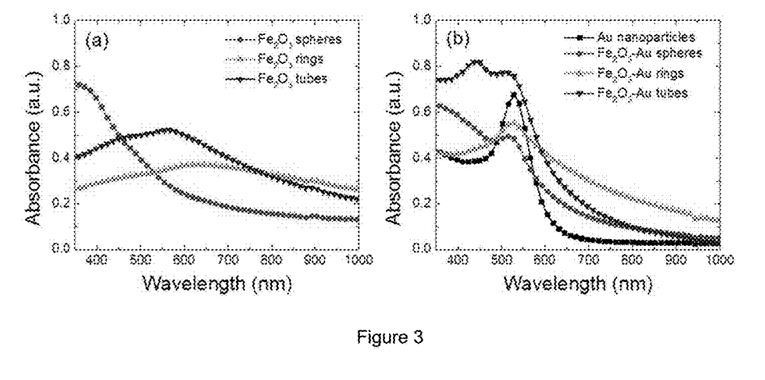
FIG. 3 provides the UV-vis spectra of the iron oxide substrates, gold nanoparticles, and gold-iron oxide nanomaterials of the examples.

According to the UV-visible spectroscopy measurements and as illustrated in FIG. 3, the different shapes of the iron oxide substrates results in different scattering properties. After the gold treatment, the spectra of the iron oxide substrates are changed demonstrating the gold nanoparticle formation on the iron oxide substrate. Notably, in the spectra for the gold-iron oxide nanomaterials, a peak emerges at a wavelength of approximately 520 nm, which matches the localized surface plasmon resonance of the pure gold nanoparticles. The plasmonic properties of the gold-iron oxide nanoparticles are evident in their optical properties demonstrating that the materials are nanocomposite structures and not simply mixtures of individual nanoparticles.

According to the magnetic studies using the magnetometer at room temperature, all of the samples exhibited hysteresis, which is consistent with ferromagnetic behavior. The measurements showed that the gold-iron oxide nanotube nanomaterials have the highest saturation magnetization while the nanosphere and nanoring nanomaterials had lower saturation magnetization. The data also suggested that the nanomaterials could be easily manipulated and separated from their media by the use of a magnetic field.

Example 3—Catalytic Experiments

The catalytic experiments were conducted inside 3 mL quart cuvettes by combining the following: 1.5 mL DI water; 200 µL nanocatalyst solution; 150 µL 2 mM nitrophenol solution; and 200 µL freshly prepared 0.06 M $NaBH_4$ solution. After adding the $NaBH_4$ to the other reactants, the solution immediately turns yellow and the catalytic reaction commences. The catalytic reaction is monitored by in-situ UV-vis spectroscopy, where the absorption peak of nitrophenol at wavelength of 400 nm is used to quantify the concentration. The catalytic reaction proceeds until the peak at a wavelength of 400 nm disappears.

Figure 4:
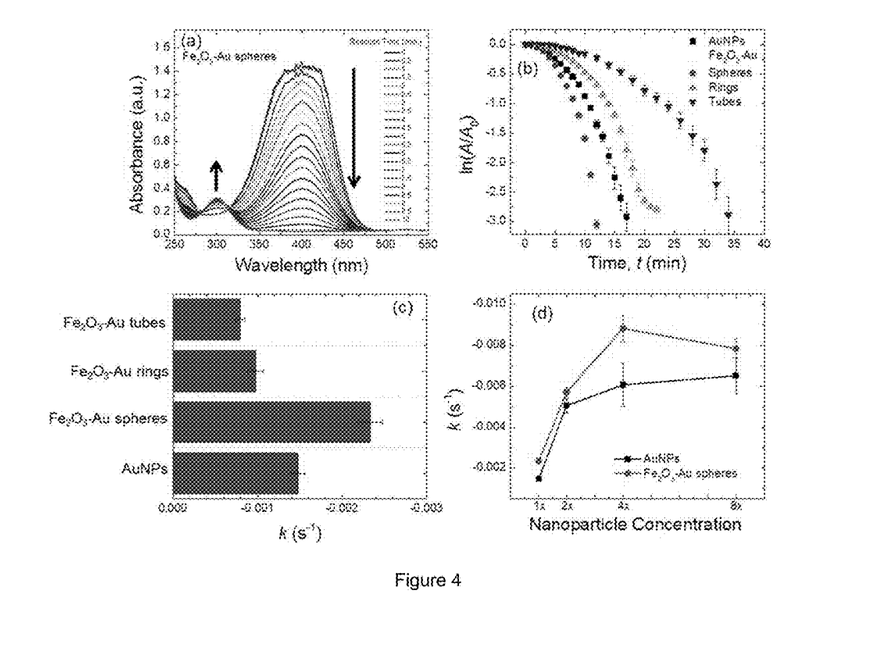
FIG. 4 provides graphs demonstrating the results of the catalytic experiments of the examples.

The reduction of 4-nitrophenol was employed as a model reaction to evaluate the catalytic properties of the different gold-iron oxide nanomaterials. Experiments were performed in the presence and absence of catalyst to evaluate the reaction's effectiveness. In general, without a catalyst, sodium borohydride does not react with 4-nitrophenol. However, in the presence of a catalyst, such as gold, 4-nitrophenol is rapidly reduced to 4-aminophenol by sodium borohydride. This conversion reaction can be monitored by in-situ UV-vis by observing the decay of the strong 4-nitrophenol peak at a wavelength of approximately 400 nm and the increase in the 4-aminophenol peak at a wavelength of approximately 300 nm. As illustrated in FIG. 4(a), the decay experiment as measured by UV-vis can be monitored.

Control experiments with ($NaBH_4$ without catalyst, catalyst without $NaBH_4$, pure iron oxide substrates with $NaBH_4$ and without catalyst) showed no appreciable degradation of 4-nitrophenol. On the other hand, gold nanoparticles and the gold-iron oxide nanomaterials are able to catalytically reduce 4-nitrophenol to 4-aminophenol. FIG. 4(b) shows a plot of $\ln(A/A_0)$ versus time wherein $A_0$ is the initial absorbance and A is the absorbance at time t of the 4-nitrophenol peak. The catalytic decay depends strongly on the type, shape, and composition of the structure, with the gold-iron oxide nanosphere nanomaterials reducing 4-nitrophenol the fastest, followed by the gold nanoparticles, then the gold-iron oxide nanoring nanomaterials, and the gold-iron oxide nanotube nanomaterials. According to the studies, the gold-iron oxide nanosphere nanomaterials are even more catalytically active than the gold nanoparticles, even though they have three times as less gold, as determined by ICP-MS.

Figure 5:
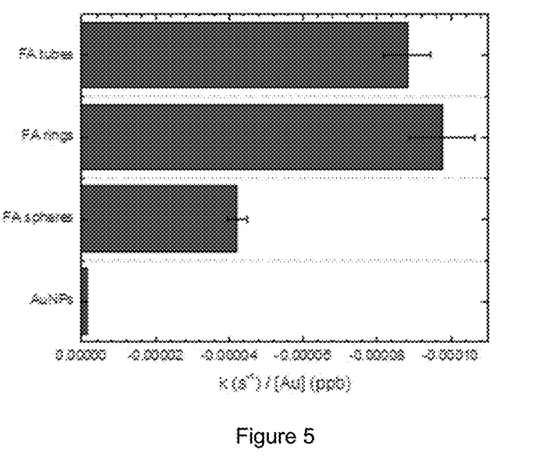
FIG. 5 provides a graph demonstrating the catalytic decay rate as a function of the gold content of the experiments of the examples.

FIG. 4(c) illustrates the decay rate of the respective reactions. The initial linear portion of the plot was fit to obtain the decay rate. As synthesized, the gold-iron oxide nanosphere nanomaterials were found to be the most catalytically active. Taking into account the different amounts of the gold, the gold-iron oxide nanoring and nanotube nanomaterials are comparable in their catalytic efficiency. In particular, the nanoring and nanotube nanomaterials are more than twice as efficient as the nanosphere nanomaterials for the amount of gold loaded onto the iron oxide substrate. Nevertheless, all of the gold-iron oxide nanomaterials are better than the pure gold nanoparticles, not only by having greater efficiencies but also by using significantly much smaller quantities of gold. The decay rate as a function of the gold content is also presented in FIG. 5.

For instance, as shown in FIG. 4(d), the gold-iron oxide nanosphere nanomaterials are found to be superior catalysts to the gold nanoparticles for increasing concentrations of nanoparticles. For instance, the change in the reaction rate, k, with increasing concentrations of nanoparticles deviates from linear behavior and appear to approach a limiting value for the given reaction conditions. Based on the Langmuir-Hinshelwood model, the catalytic reactions in these cases follow more complicated reaction kinetics.

Example 4—Photothermal Studies

The photothermal studies consisted of a laser with a wavelength of 532 nm (Del Mar Photonics, DMPV-532-1, beam diameter focused to ~20 µm at 1200 mW), where the beam path is directed onto the top surface of 3 mL nanoparticle or nanomaterial solution contained in a methacrylate cuvette. The concentration of the iron oxide in solution was $8.95 \times 10^{-6}$ M.

The cuvette was resting on a microgram scale (Mettler Toledo XP205) that provides dynamic mass measurements. The data was synchronized with the bulk solution temperature data, which was obtained form an infrared thermocouple (Omega Engineering, OS801-HT). The data was logged using a custom LabVIEW program.

Figure 6:
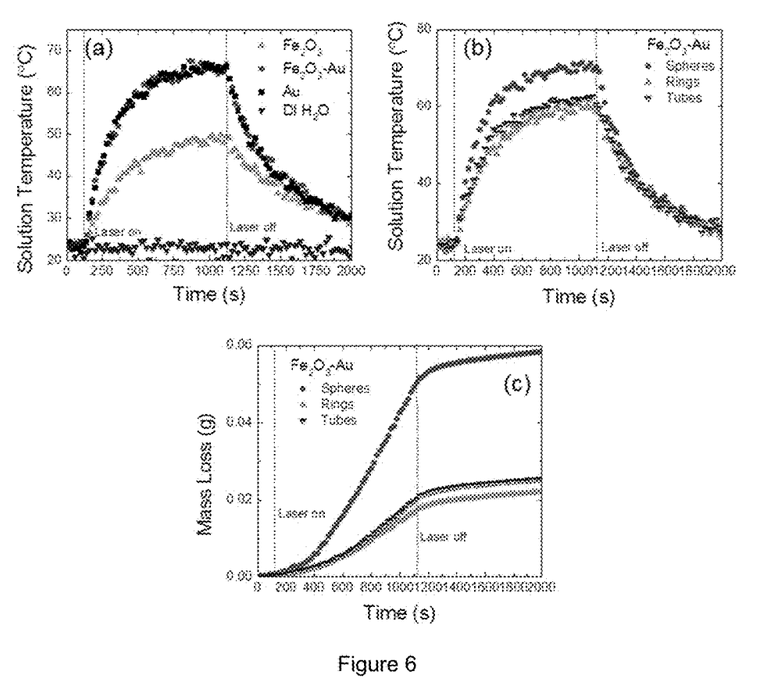
FIG. 6 provides graphs demonstrating the results of the photothermal heating studies of the examples.

For the solutions containing the nanomaterials, as shown in FIG. 6, a significant temperature rise was observed after the laser is turned on at time, t=120 s. In general, the temperature increases exponentially and approaches an equilibrium value until the laser is turned off at t=1120 s. In addition, it is important to note that the temperatures are the bulk temperatures of the solution and it is possible that the temperatures near the surface of the nanomaterials may be higher.

As shown in FIG. 6(a), the gold nanoparticles and the gold-iron oxide nanosphere nanomaterials heat the aqueous solution to equal maximum temperatures of approximately 65° C. while the pure iron oxide nanospheres heat to approximately 50° C. The control experiment found no detectable temperature rise when pure deionized water is illuminated with the laser at test conditions.

As shown in FIG. 6(b), the gold-iron oxide nanosphere nanomaterials heat the bulk solution to slightly higher temperatures than the nanoring and nanotube nanomaterials. In addition, FIG. 6(c) shows the mass loss of the gold-iron oxide nanomaterial solutions. The increase in the mass losses relative to background evaporation suggests the generation of steam (which was observed during the studies) and higher temperatures on the nanoparticle surfaces.

In addition, the photothermal properties were utilized to analyze the effect on the catalytic reaction rate. In particular, 4-nitrophenol reduction reactions were performed using the gold nanoparticles and the gold-iron oxide nanosphere nanomaterials and varying laser intensities. The bulk temperature and the UV-vis spectra of the reaction solution were monitored in-situ during the photothermal catalytic reactions. It was found that the reaction rates increase with increasing laser intensities, solution temperatures, or both. The activation energies were calculated and found to be significantly higher than those observed in other gold catalyzed 4-nitrophenol reductions. Without intending to be limited by theory, it could be that the change in catalytic reaction rate could be occurring over a greater temperature scale than is indicated by the measurements. It is also possible that the photochemical effects could also contribute to the greater increase in reaction rates with temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of photothermally heating a solution, the method comprising
exposing the solution to at least one wavelength of light of the electromagnetic spectrum,
wherein the solution contains gold-iron oxide nanomaterials comprising an iron oxide substrate and discrete gold particles deposited on the iron oxide substrate,
wherein the iron oxide substrate comprises a nanotube, a nanoring, or mixtures thereof.

2. The method of claim 1, wherein the at least one wavelength of light is in the visible light spectrum.

3. The method of claim 1, wherein the at least one wavelength of light is in the infrared spectrum.

4. The method of claim 1, wherein the at least one wavelength of light is in the ultraviolet spectrum.

5. The method of claim 1, wherein the iron oxide substrate is a nanotube.

6. The method of claim 1, wherein the iron oxide substrate is a nanoring.

7. The method of claim 1, wherein the iron oxide substrate has an average outer diameter of from 5 nm to 500 nm.

8. The method of claim 1, wherein the iron oxide substrate has an inner diameter of from 5 nm to 500 nm.

9. The method of claim 1, wherein the iron oxide substrate has an average length of from 10 nm to 500 nm.

10. The method of claim 1, wherein the iron oxide is $Fe_2O_3$.

11. The method of claim 1, wherein the iron oxide has a maghemite crystal phase.

12. The method of claim 1, wherein the iron oxide has a hematite crystal phase.

13. The method of claim 1, wherein the gold particles have an average diameter of from 5 nm to 100 nm.

14. The method of claim 1, wherein the gold particles are not agglomerated on the iron oxide substrate.

15. The method of claim 1, wherein the gold-iron oxide nanomaterial has an average surface area of from 5 $m^2/g$ to 200 $m^2/g$.

16. The method of claim 1, wherein the iron oxide substrate of the gold-iron oxide nanomaterial has an average surface area of from 5 $m^2/g$ to 200 $m^2/g$.

17. The method of claim 1, wherein the gold particles of the gold-iron oxide nanomaterial have an average surface area of from 0.0001 $m^2/g$ to 5 $m^2/g$.

18. The method of claim 1, wherein the iron to gold atomic ratio of the gold-iron oxide nanomaterial is from 3 to 200.

19. The method of claim 1, wherein the at least one wavelength is in a range of from 400 nm to 750 nm.

20. The method of claim 1, wherein the solution is exposed for at least 3 minutes and the bulk temperature of the solution increases by at least 10° C.

21. The method of claim 1, wherein if the solution is exposed to a wavelength of from 500 to 600 nm for at least 5 minutes, the bulk temperature of the solution increases by at least 10° C.

22. The method of claim 1, wherein the solution is an aqueous solution.

23. The method of claim 1, wherein the solution further comprises at least one reactant, reagent, or any combination thereof.

24. The method of claim 23, wherein the method further comprises a method of catalyzing a reaction.

* * * * *